(12) United States Patent  
Nakamura (10) Patent No.: US 8,047,597 B2  
(45) Date of Patent: Nov. 1, 2011

(54) LEG SHIELDS IN VEHICLE

(75) Inventor: Kozo Nakamura, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 231 days.

(21) Appl. No.: 12/485,762

(22) Filed: Jun. 16, 2009

(65) Prior Publication Data

US 2009/0250963 A1  Oct. 8, 2009

(30) Foreign Application Priority Data

Jul. 4, 2008  (JP) ................................ 2008-176003

(51) Int. Cl.  
*B62J 17/00*  (2006.01)

(52) U.S. Cl. ...................................... 296/78.1

(58) Field of Classification Search .............. 296/78.1; 237/12.3 A; 454/156, 121; 165/42, 43, 202, 165/204

See application file for complete search history.

(56) References Cited

U.S. PATENT DOCUMENTS

| | | | | |
|---|---|---|---|---|
| 3,808,985 A | * | 5/1974 | Raber | 110/194 |
| 4,013,434 A | * | 3/1977 | Kronenberger et al. | 62/382 |
| 4,130,315 A | * | 12/1978 | Shields | 296/78.1 |
| 4,215,266 A | * | 7/1980 | Smith et al. | 219/413 |
| 4,479,676 A | * | 10/1984 | Hayes | 296/78.1 |
| 4,536,005 A | * | 8/1985 | Tanaka et al. | 296/78.1 |
| 4,615,556 A | * | 10/1986 | Stahel | 296/78.1 |
| 4,751,911 A | * | 6/1988 | Betts et al. | 126/261 |
| 4,776,422 A | * | 10/1988 | Sakuma | 180/219 |
| 5,044,121 A | * | 9/1991 | Harbom et al. | 49/401 |
| 5,467,250 A | * | 11/1995 | Howard et al. | 361/696 |
| 5,515,774 A | * | 5/1996 | Swisher et al. | 99/340 |
| 5,699,745 A | * | 12/1997 | Kaehr | 110/194 |
| 5,749,178 A | * | 5/1998 | Garmong | 52/79.1 |
| 5,870,944 A | * | 2/1999 | Vander Zalm et al. | 99/323.2 |
| 6,048,263 A | * | 4/2000 | Uchida et al. | 454/121 |
| 6,263,994 B1 | * | 7/2001 | Eitel | 180/219 |
| 6,544,115 B1 | * | 4/2003 | Graf | 454/143 |
| 6,983,566 B2 | * | 1/2006 | Laun et al. | 49/507 |
| 7,607,673 B1 | * | 10/2009 | Vey | 280/163 |
| 7,832,516 B2 | * | 11/2010 | Bagnariol | 180/219 |
| 7,883,136 B2 | * | 2/2011 | Tomolillo et al. | 296/78.1 |
| 2010/0301627 A1 | * | 12/2010 | Kern | 296/78.1 |

FOREIGN PATENT DOCUMENTS

JP  61-19994  6/1986

* cited by examiner

*Primary Examiner* — Kiran B. Patel (57) ABSTRACT

A leg shield for covering a rider's leg from front includes a shielding body positioned forwardly of a foot rest and having a ventilation opening defined therein, and a vent door pivotable about an axis of pivot for selectively opening and closing the ventilation opening. The vent door has first and second ends spaced from each other in a direction conforming to the axis of pivot and is rotatably supported at the first and second ends by first and second door support members, respectively. The axis of pivot is positioned spaced from the ventilation opening in a direction towards an inner surface of the shielding body, and the first and second door support members of the shielding body are positioned spaced away from the ventilation opening when viewed from front.

14 Claims, 10 Drawing Sheets

RIGHT SIDE OF MOTORCYCLE BODY ←

LEFT SIDE OF MOTORCYCLE BODY →

LEG SHIELDS IN VEHICLE

CROSS REFERENCE TO THE RELATED APPLICATIONS

This application is based on, and claims foreign priority to, the Japanese Patent Application No. 2008-176003 filed in Japan on Jul. 4, 2008, the entire teachings of which is incorporated herein by reference as a part of this application.

BACKGROUND OF THE INVENTION

1. Field of the Invention

The present invention relates to leg shields in an automotive vehicle for protecting driver's legs against the incoming wind induced during the travel of the automotive vehicle and moving relatively in a direction opposite to the direction of travel of the automotive vehicle.

2. Description of the Prior Art

Some of the large motorcycles, particularly touring models thereof, are equipped with left and right leg shields positioned forwardly of foot rests on respective sides of the motorcycle for protecting driver's legs from the incoming wind. It has, however, been found that since the motorcycle combustion engine is positioned inwardly of the foot rests, interruption of flow of the wind around the driver's legs leads to stagnation of air of a relatively elevated temperature in the vicinity of and around the driver's feet particularly during the summer season. Japanese Examined Utility Model Publication No. S61-19994, published Jun. 16, 1986, for example, discloses a small motorcycle such as a motor scooter employing a ventilating system.

According to this Japanese publication, the motor scooter has a protective shield for protecting the driver's legs and a front cover above the protective cover. The front cover has the ventilating system which includes left and right openings or windows and a shutter employed for each of the windows for opening and closing the window. The window is opened to allow the incoming wind to enter through the windows towards and around the driver's legs.

In respective embodiments shown in and described with particular reference to FIGS. 3 to 6 of the Japanese Examined Utility Model Publication referred to above, each of the doors is supported for movement between opened and closed positions about upper and lower vertical stud shafts that are coaxial with each other and that are positioned at a location substantially intermediate of the width of the window. Accordingly, when the shutter is moved to the opened position to allow the incoming wind to enter inwardly of the front cover, the shutter and the stud shafts constitute an obstruction to the incoming wind flowing through the windows. Furthermore, since the shutter is exposed to the incoming wind, the stud shafts are required to be robustly supported.

Also, in a different embodiment shown in and described with particular reference to FIG. 10 of the Japanese Utility Model Publication referred to above, since the stud shafts for pivotally supporting the shutter are disposed adjacent upper and lower corners of one side edge of the shutter, the stud shafts will not constitute any obstruction to the incoming wind. However, since the shutter is equally exposed to the incoming wind, the stud shafts must be robustly supported with high strength.

SUMMARY OF THE INVENTION

The present invention has been devised to substantially eliminate the problems and inconveniences referred to above and is intended to provide an improved leg shield in an automotive vehicle designed to increase the amount of air that can be supplied towards the driver's leg and to allow lids to be stably supported.

In order to accomplish the foregoing object, the present invention provides a leg shield for use in an automotive vehicle for covering a leg of a rider from front, which includes a shielding body positioned forwardly of a foot rest and having a ventilation opening defined therein, and a vent door pivotable about an axis of pivot for selectively opening and closing the ventilation opening. The vent door has first and second ends spaced from each other in a direction conforming to the axis of pivot and is pivotably supported at the first and second ends by first and second door support members in the shielding body. The axis of pivot is positioned spaced from the ventilation door inwardly of an inner surface of the shielding body, and the first and second door support members in the shielding body are positioned spaced away from the ventilation opening when viewed from front.

According to the construction referred to above, the vent door is pivotally supported by the shielding body with the first and second ends thereof aligned with the axis of pivot C and coupled with the first and second door support members at a location intermediate of the circumference about the axis of pivot, and accordingly, the vent door can be advantageously stably supported even when the wind pressure acts thereon during the full or partial opening of the respective ventilation opening. Also, the axis of pivot is defined at a position spaced from the ventilation opening in a direction towards the inner surface of the shielding body and the first and second door support members are positioned spaced away from the associated ventilation opening as viewed from front. Accordingly, it is possible to avoid the possibility that the first and second door support members may block respective parts of the ventilation opening during the full opening of such ventilation opening while the design has been made to stabilize the vent door by supporting the opposite ends located intermediate along the circumference of the vent door. Thus, a substantial amount of air can be guided towards the rider's leg.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

REFERENCE NUMERALS

25: Foot rest
37: Leg shield
39: Ventilation opening
39a: Reinforcement rib
40: Shielding body
43: Vent door
43a: First end (First to-be-supported element)
43b: Second end (Second to-be-supported element)
45: Door adjusting mechanism
47: Lever
49: Finger
51: Engagement hole
53: Engagement element
55: Biasing spring
69: First door support member
70: Second door support member
C: Axis of pivot
E: Motorcycle combustion engine
FR: Motorcycle frame structure

DESCRIPTION OF THE PREFERRED EMBODIMENTS

A preferred embodiment of the present invention will now be described in detail with reference to the accompanying drawings.

Figure 1:
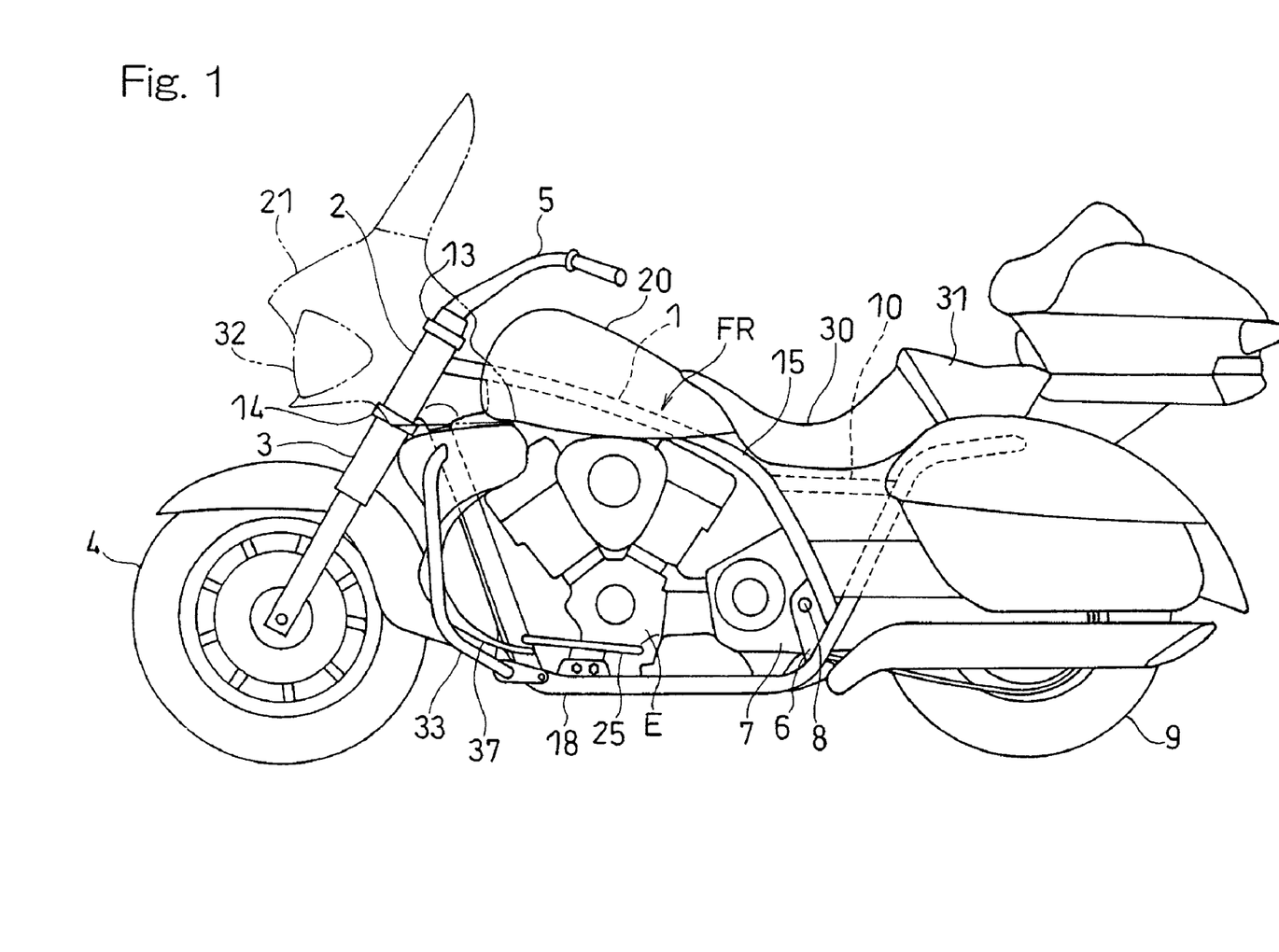
FIG. 1 is a side view showing a motorcycle according to a first preferred embodiment of the present invention.

Referring to FIG. 1, there is shown a schematic side view of a motorcycle equipped with left and right leg shields according to a preferred embodiment of the present invention. The motorcycle shown therein includes a motorcycle frame structure FR. This motorcycle frame structure FR includes a main frame 1 forming a front frame region of the motorcycle frame structure FR. The main frame 1 has a head tube 2 rigidly connected with a front end portion thereof, and extends rearwardly from the head tube 2 towards a swingarm bracket 6 after having been downwardly curved as at a downwardly curved region 15. Left and right spaced seat rails 10 extend rearwardly from the downwardly curved region 15 of the main frame 1, and left and right down tubes 18 extend downwardly from the head tube 2 and then extending rearwardly through the swingarm bracket 6 before they are connected respectively with the left and right seat rails 10.

An upper bracket 13 and a lower bracket 14 are spacedly supported by the head tube 2 through a steering shaft (not shown) that is coaxially and rotatably inserted in and extending inside the head tube 2. A front fork assembly 3 is supported by the upper and lower brackets 13 and 14 for rotation together with the head tube 2 for steering purpose. The front fork assembly 3 has a front wheel 4 rotatably supported at a lower end thereof for rotation in any manner well known to those skilled in the art. A handlebar 5 is rigidly mounted on the upper bracket 13 at an upper end of the front fork assembly 3 for movement together with the steering shaft and, hence, with the front fork assembly 3.

The swingarm bracket 6 is secured to a lower rear portion of the main frame 1 and a swingarm 7 is pivotably supported by the swingarm bracket 6 through a pivot shaft 8 at a front end thereof for movement up and down. The swingarm 7 in turn supports a rear wheel 9 rotatably in any manner known to those skilled in the art.

The left and right seat rails 10 connected rigidly with a rear portion of the main frame 1 forms a rear frame region of the motorcycle frame structure FR. The left and right seat rails 10 have a rider's seat 30 and a fellow passenger's seat 31 fixedly mounted thereon. A V-twin internal combustion engine E forming a motorcycle power plant is supported in a generally lower intermediate portion of the main frame 1 and between the front wheel 4 and the rear wheel 9. A fuel tank 20 accommodating a quantity of fuel is fixedly mounted on an upper portion of the main frame 1—that is, an upper portion of the motorcycle body—and between the handlebar 5 and the rider's seat 30. A fairing 21 made of a resin is mounted on a front portion of the motorcycle so as to cover a region running from an area forwardly of the handlebar 5 to an area laterally upwardly of the motorcycle body, and a headlight assembly 32 is fitted to the fairing 21.

Left and right engine guards 33 for protecting the combustion engine E are positioned downwardly of the fairing 21 and are supported by respective front halves of the left and right down tubes 18 that extend generally vertically. The engine guards 33 are operable to avoid an undesirable direct contact of the combustion engine E with the road surface in the event of fall of the motorcycle. The engine guards 33 are employed in the form of, for example, tubular elongated members such as pipes and extend laterally outwardly from the corresponding down tubes 18. A pair of left and right foot rests 25 are mounted on respective rear halves of the down tubes 18 that extend substantially horizontally, and a pair of left and right leg shields 37 for covering the rider's legs are mounted on the respective down tubes 18 through the engine guards 33.

Figure 2:
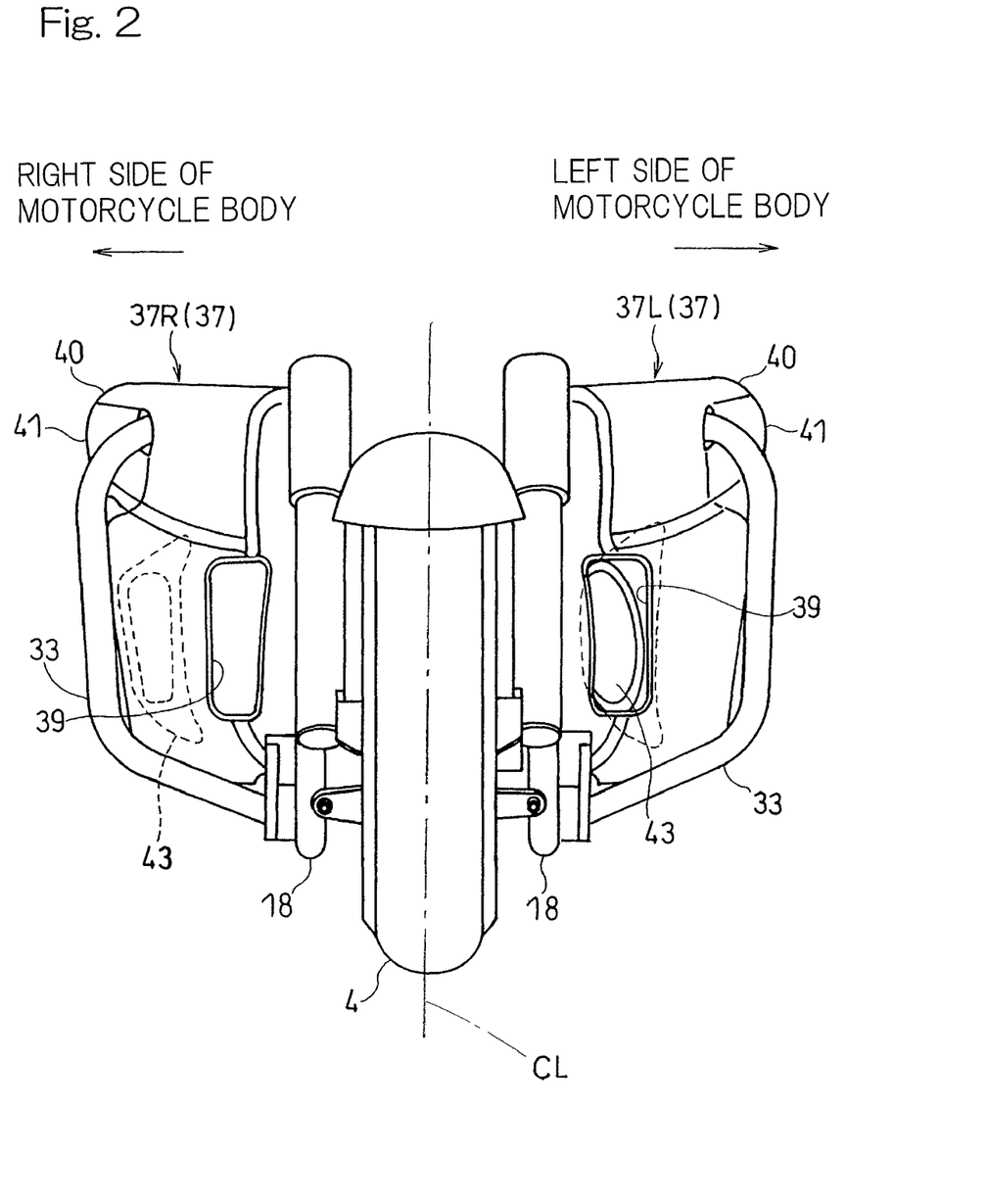
FIG. 2 is a front elevational view showing a front lower portion of the motorcycle.

Referring now to FIG. 2 showing a front elevational view of a front lower portion of the motorcycle, the left and right leg shields 37 are symmetrical with respect to a widthwise center line CL of the motorcycle and, hence, of an identical construction with each other. Each of the leg shields 37 includes a shielding body 40 having a ventilation opening 39 defined therein at a location forwardly of the associated foot rest 25 best shown in FIG. 1, a covering 41 for covering a region where the engine guard 33 and the shielding body 40 are fitted to each other, a vent door 43 for selectively opening and closing the respective ventilation opening 39, and a door adjusting mechanism 45 for adjusting the opening/closing of the respective vent door 43 in stepwise fashion in a manner as will be described in detail later with particular reference to FIG. 3. In FIG. 2, the left ventilation opening 39 in one of the leg shields, which is positioned on a left side as viewed from the rider occupying the rider's seat 30, that is, the left leg shield indicated by 37L, is shown as fully opened with the associated vent door 43 pivoted to a fully opened position whereas the other of the leg shields positioned on a right side as viewed from the rider occupying the rider's seat 30, that is, the right leg shield indicated by 37R, is shown as closed with the associated vent door 43 pivoted to a completely closed position.

Each of the ventilation openings 39 in the respective leg shields 37 (37L and 37R) has a continuous peripheral edge. In the illustrated embodiment, each of the ventilation openings 39 is of a substantially or generally rectangular shape having its longitudinal axis oriented substantially vertically. Also, each of the ventilation openings 39 is defined in the associated leg shield 37 at a location lower in level than the top of the front wheel 4.

It is to be noted that although in this illustrated embodiment, the shielding bodies 40, the coverings 41 and the doors 43 are made of a resin, they may be made of a metallic material.

Figure 3:
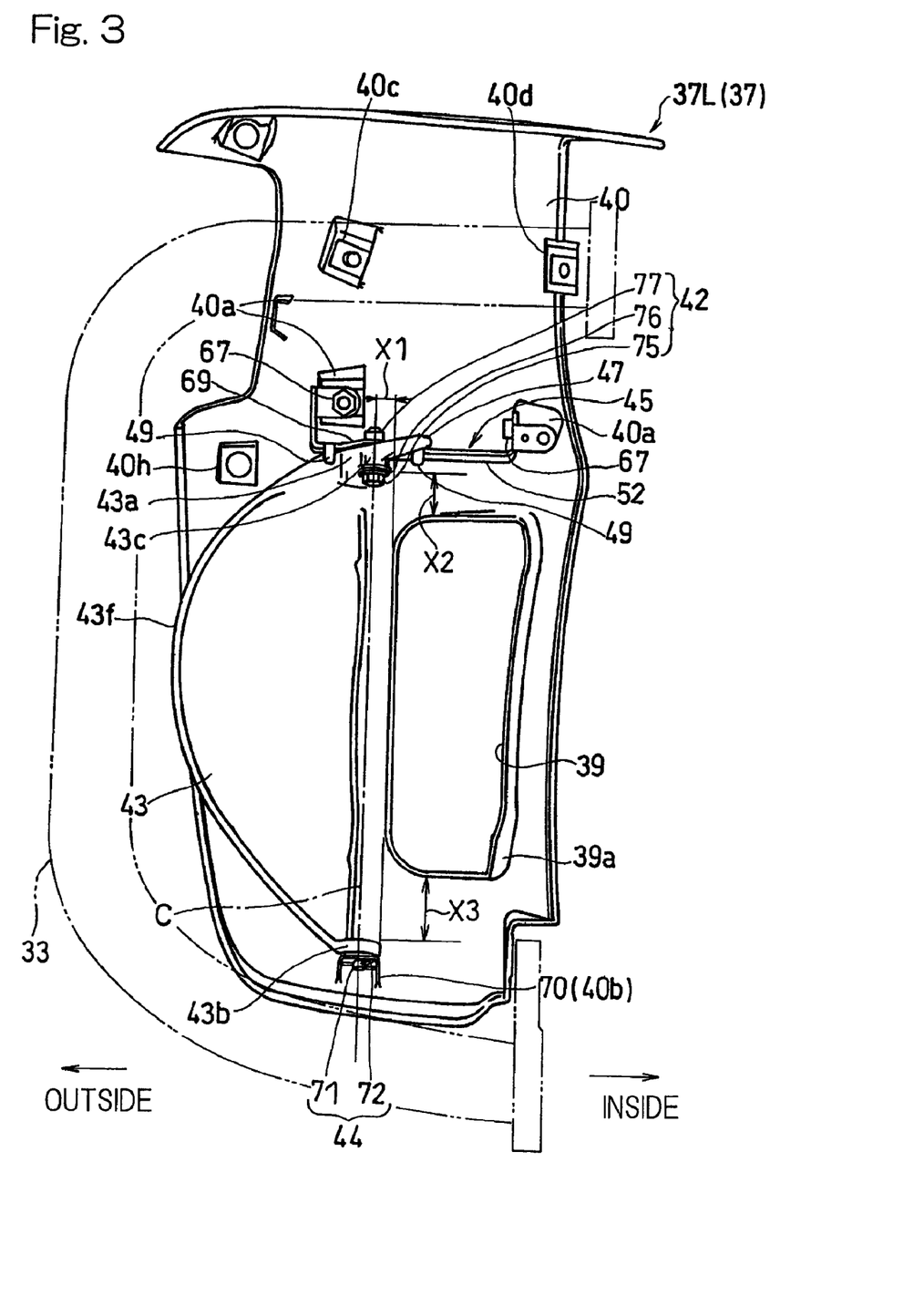
FIG. 3 is a rear view showing one of left and right leg shields employed in the motorcycle, with a door held in a fully opened position to open a corresponding opening.
Figure 4:
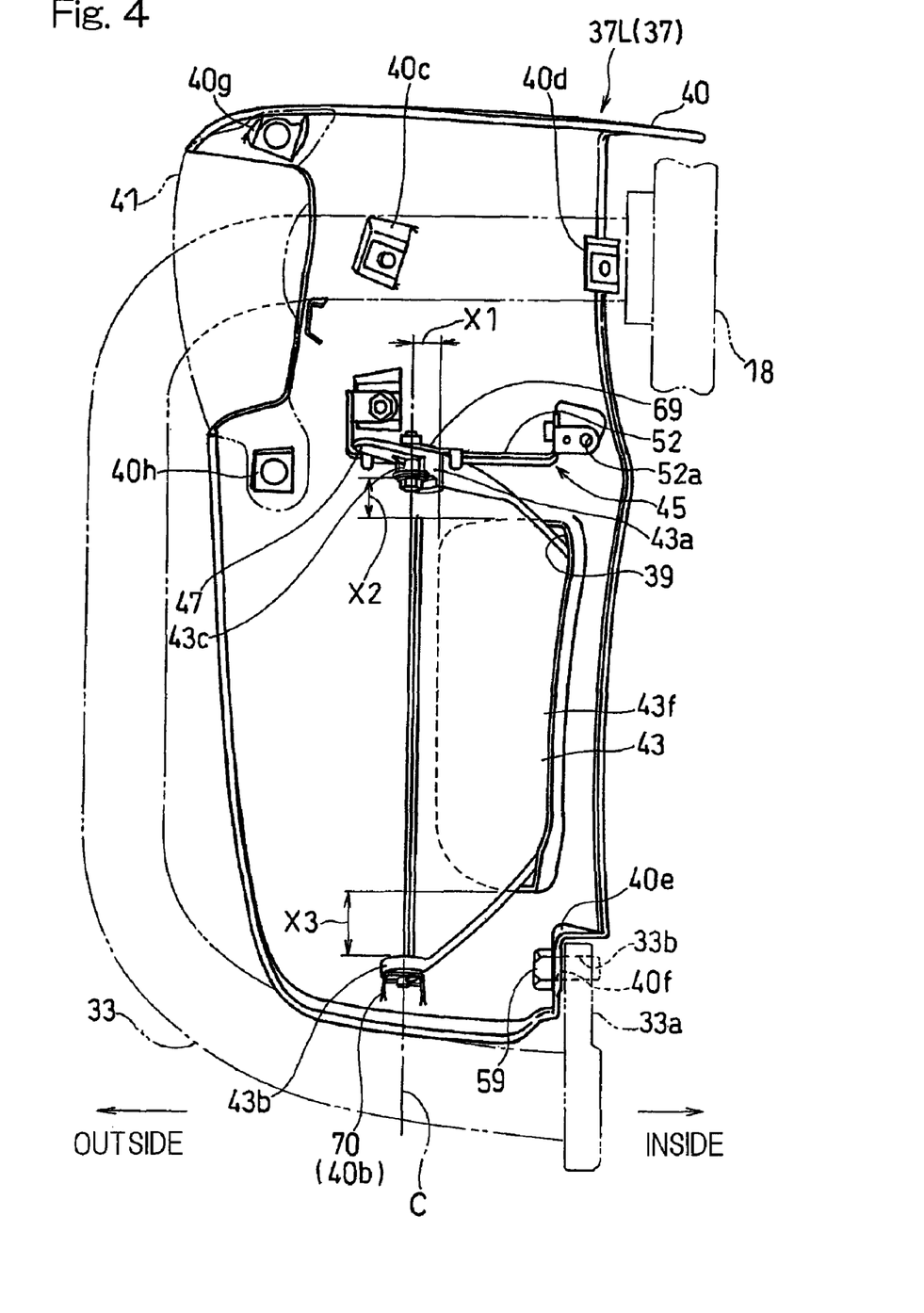
FIG. 4 is a rear view showing the respective leg shield, with the door held in a completely closed position to close the corresponding opening.
Figure 5:
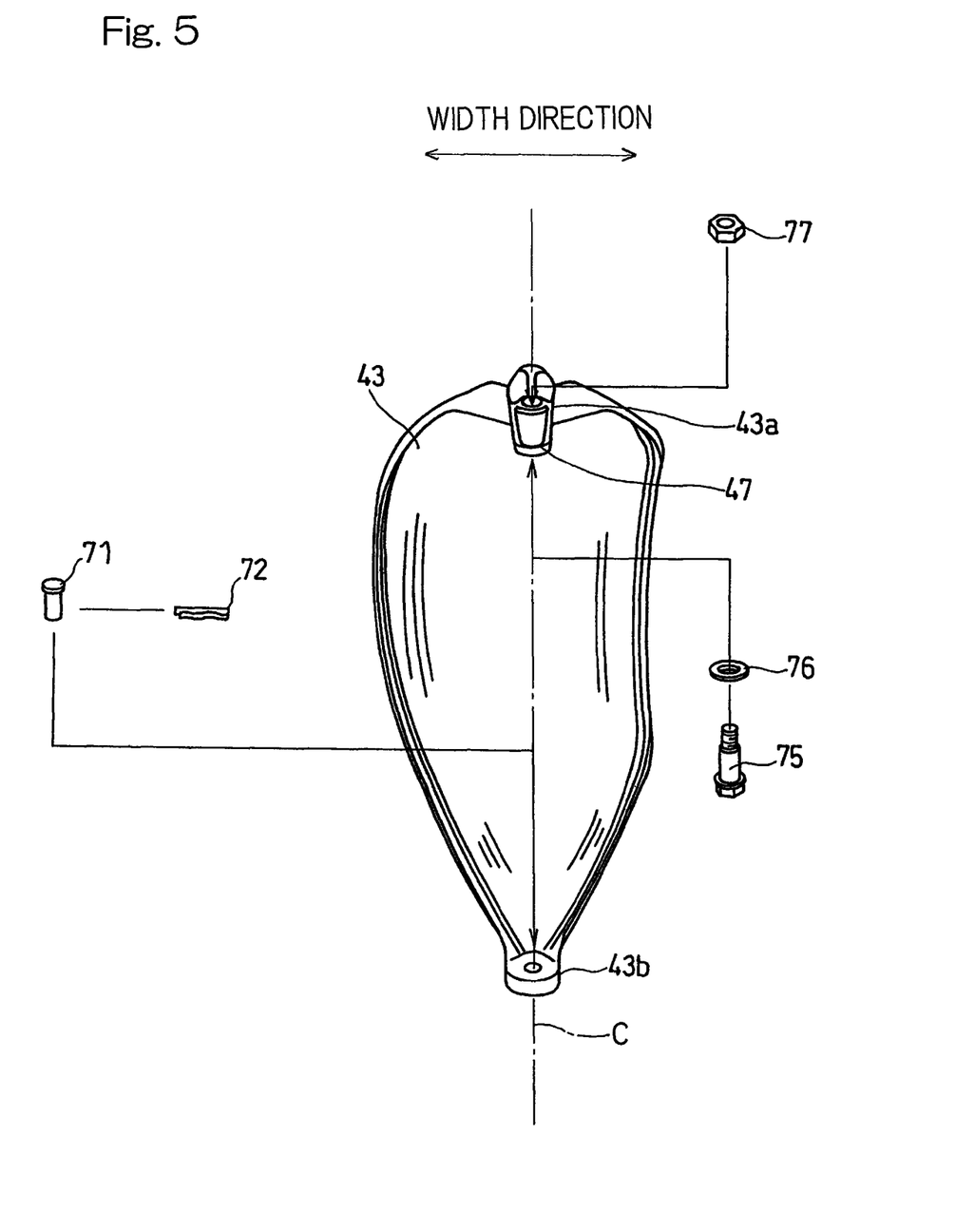
FIG. 5 is a perspective view showing the door as viewed from above in a direction slantwise downwardly.

Hereinafter, the left leg shield 37L is discussed as a representative. FIGS. 3 and 4 illustrate the left leg shield 37L as viewed from rear and FIG. 5 illustrates one of the vent doors 43 as viewed from rear. FIG. 3 shows the leg shield 37L with the vent door 43 held in the fully opened position to leave the ventilation opening 39 fully open whereas FIG. 4 shows the leg shield 37L with the vent door 43 held in the closed position to allow the ventilation opening 39 to be completely closed.

As best shown in FIG. 3, the shielding body 40 has its inner surface formed with a reinforcement rib 39a extending over the entire periphery of the associated ventilation opening 39 and protruding inwardly of the shielding body 40. This rib 39a so protruding inwardly of the shielding body 40 is continuous over the entire periphery of the ventilation opening 39. It is to be noted that the inner surface 40i of each of the shielding bodies 40 is one of the opposite surfaces of the respective shielding body 40, which is adjacent to the rider's legs, but opposite to the surface thereof, i.e., outer surface 40o, on which the incoming wind impinges.

As best shown in FIG. 5, the door 43 has an upper end 43a, which is the topmost portion thereof defined at a location intermediate of the circumference about an axis of pivot C as will be described later, and a lower end 43b which is opposite to the upper end 43a and the lowermost portion thereof. On the other hand, the shielding body 40 is formed with a first door support member 69, positioned at a location alignable with the upper end 43a of the associated vent door 43, and a second door support member 70 positioned at a location alignable with the lower end 43b of the associated vent door 43. Hence, the vent door 43 is pivotally supported by the associated shielding body 40 through the first and second door support members 69 and 70 for movement between the fully opened position and the completely closed position about the axis of pivot C.

The first door support member 69 is formed at a free end portion of a bracket 52 removably fitted by means of fastening members 67, 67 to an upper mounting seat 40a that is formed integrally with the shielding body 40. The upper end 43a of the vent door 43 is pivotally coupled with the first door support member 69 by means of a first pivotal support unit 42 made up of a stud shaft 75, a washer 76 and a nut 77. On the other hand, the second door support member 70 positioned below the first door support member 69 includes a lower mounting seat 40b, formed integrally with the shielding body 40, and the lower end 43b of the vent door 43 is pivotally coupled with the second door support member 70 by means of a second pivotal support unit 44 made up of a pin 71 and a detent element 72.

The first pivotal support unit 42 and the second pivotal support unit 44 are positioned spaced a distance from each other in a vertical direction with their respective axes aligned with each other on the same line to thereby define the axis of pivot C about which the vent door 43 pivots between the fully opened and completely closed positions. The use of the first and second pivotal support units 42 and 44, positioned one above the other in the vertical direction, is particularly advantageous in that, as compared with the case in which a single long shaft member extending from the upper end 43a down to the lower end 43b is employed, the space afforded inwardly by each of the leg shields 37 can be utilized efficiently.

The axis of pivot C referred to hereinabove extends in a direction substantially parallel to a lengthwise direction of the rectangular ventilation opening 39 and is, in the illustrated embodiment, oriented substantially or generally vertically. This axis of pivot C occupies a position spaced from the associated vent door 43 in a direction inwardly (rearwardly) of the associated shielding body 40. Accordingly, as will be described in detail later, it is possible to support the vent door 43 stably at a location substantially intermediate of the width thereof, to set the axis of pivot C at a location spaced laterally from the ventilation opening 39, and to enable the vent door 43 to pivot about the axis of pivot C during the selective opening or closing of the associated ventilation opening 39 along the inner surface of the respective shielding body 40, which is of a shape bulged outwardly.

As best shown in FIG. 4, the shielding body 40 is disposed spaced a slight distance from both of the adjacent down tube 18 and the adjacent engine guard 33, with the ventilation opening 39 therein held at a location close to the down tube 18, but lower in level than the top of the front wheel 4 (FIG. 2).

Figure 6:
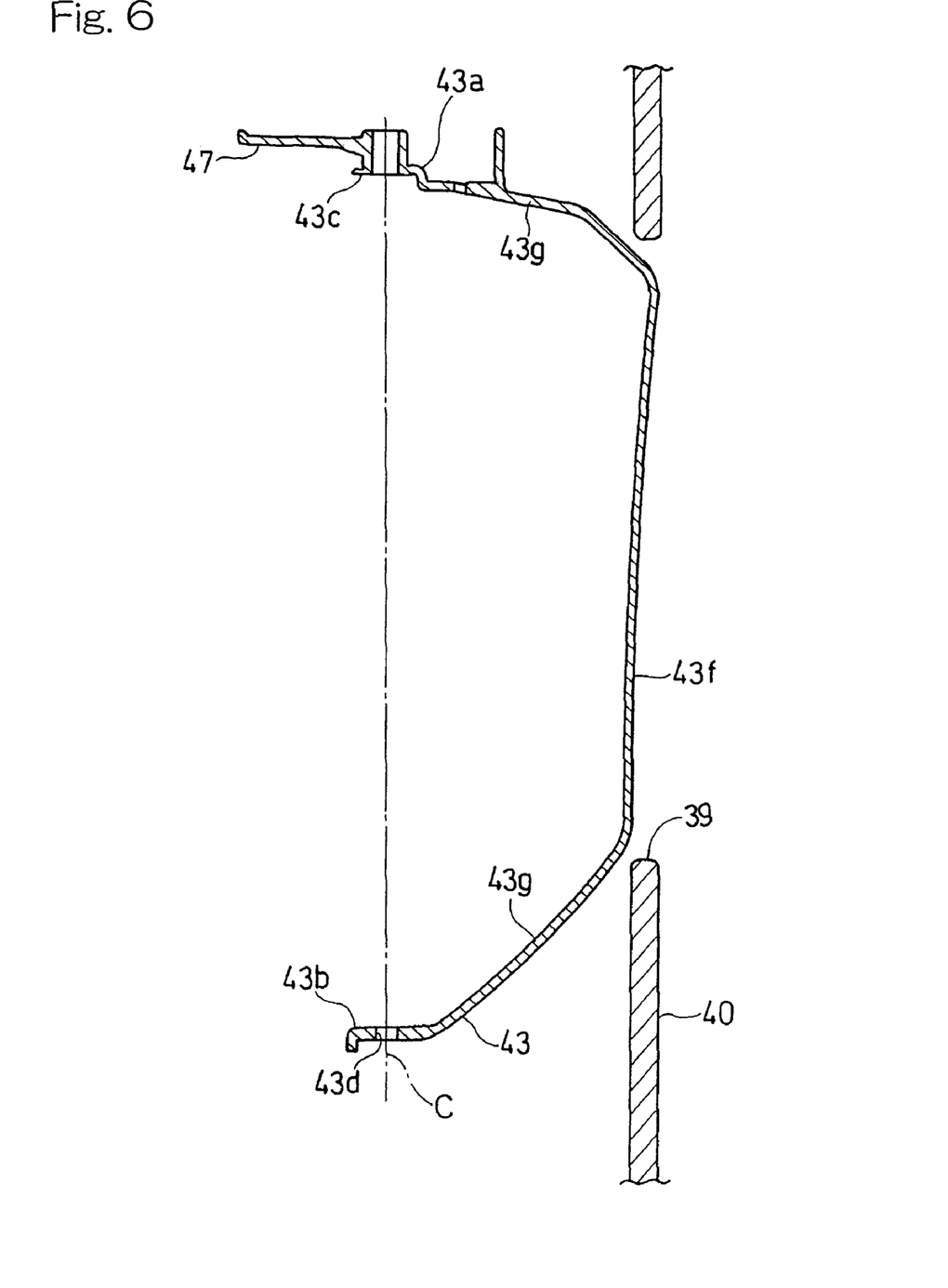
FIG. 6 is a sectional view of the door shown together with an axis of pivot thereof.

Referring now to FIG. 6, the upper end 43a of each of the doors 43, which defines a first to-be-supported element, is formed integrally with a bearing 43c in the form of a plain bearing and, on the other hand, the lower end 43b thereof, which defines a second to-be-supported element, is formed with a throughhole 43d. The upper end (the first to-be-supported element) 43a and the lower end (the second to-be-supported element) 43b are, as best shown in FIG. 3, displaced a distance X1 from the associated ventilation opening 39 in a direction outwardly of the associated shielding body 40, that is, in a direction away from the mid center line CL of the motorcycle (FIG. 2). At the same time, the upper end 43a is displaced a distance X2 upwardly from the ventilation opening 39 and the lower end 43b is displaced a distance X3 downwardly from the ventilation opening 39.

In view of the above, the upper end 43a of the door 43 and the lower end 43b thereof are, when viewed from front as shown in FIG. 2, hidden behind the associated shielding body 40, having been a distance away from the associated ventilation opening 39. In other words, it is possible to prevent the incoming wind to impinge upon both of the upper and lower ends 43a and 43b. Also, each of the doors 43 is, when pivoted to the fully opened position to fully open the associated ventilation opening 39, positioned inwardly of the associated shielding body 40 and is, hence, a distance away from such ventilation opening 39 while being hidden behind such shielding body 40.

As shown in FIG. 6, the vent door 43 has connecting areas 43g and 43g extending from the upper end 43a and the lower end 43b, respectively, and a shutter body 43f connecting the connecting areas 43g and 43g to each other and having flat surface substantially parallel to the axis C. Each of the connecting areas 43g and 43g is curved so as to extend away from the axis C. The sectional shape of the door 43, which contains the axis of pivot C, is such that a portion of the vent door 43 conforming to an axial direction and intermediate between the upper end 43a and the lower end 43b is bulged outwardly, that is in a direction away from the axis C. More specifically, the door 43 has a shape following the surface of the ellipsoid generally represented by, for example, a rugby ball. Accordingly, while the axis of pivot C is positioned a distance away from the front surface of the vent door 43 and the latter has a generally elongated shape, the upper end 43a and the lower end 43b are smoothly continued to the door body 43f through the respective connecting areas 43g and 43g. With the sectional shape of the door 43 being so curved as hereinabove described, the curved portion functions as a reinforcement and, accordingly, the vent door 43 can have an increased strength as compared with a door formed in a flat plate shape.

The vent door 43 has a lever 47 fitted thereto for manipulating the vent door 43 to pivot between the fully opened position and the completely closed position. In other words, the lever 47 is integrally provided in the respective vent door 43 representing the curved plate shape, together with the bearing 43c at the upper end 43a thereof. This lever 47 protrudes from the upper end 43a, which is positioned at an upper region of the vent door 43, in a direction counter to the door body 43f. It is to be noted that although in the illustrated embodiment, the lever 47 has been shown and described as formed only in the upper end 43a, it may be formed only in the lower end 43b instead of the upper end 43a or may be formed in both of the upper and lower ends 43a and 43b.

Figure 7:
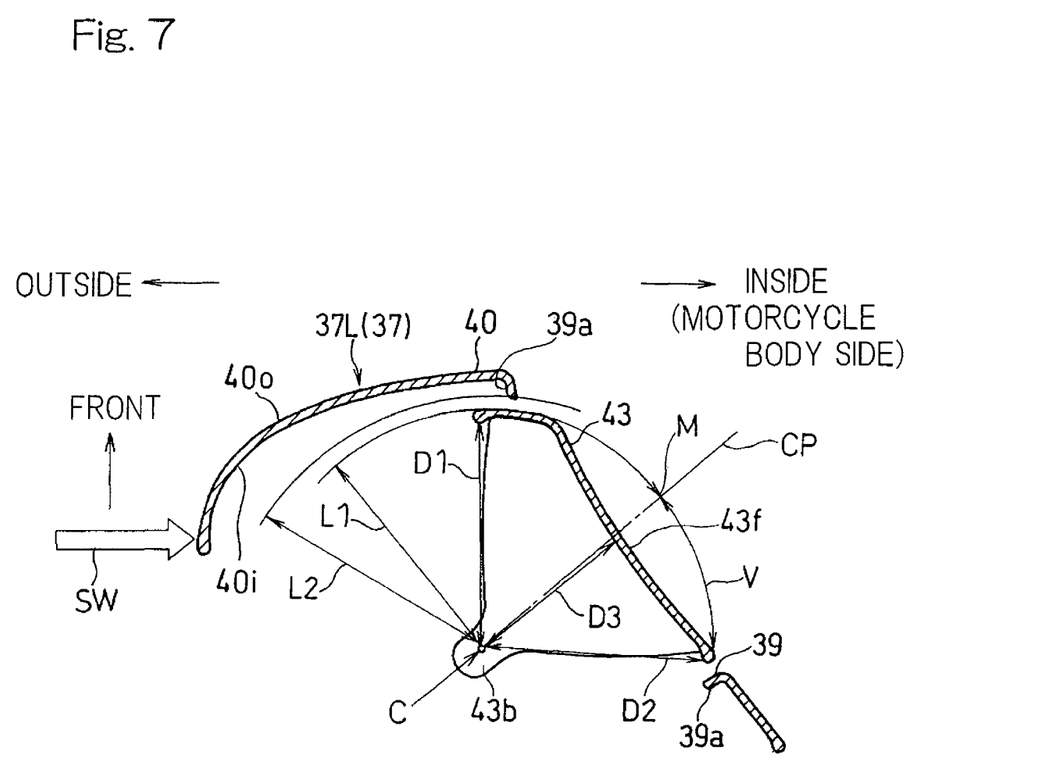
FIG. 7 is a horizontal sectional view showing the leg shield with the door held in the closed position.

As shown in FIG. 7 showing a horizontal sectional view of the leg shield 37, assuming that the distance to a portion of each of the vent door 43, which is most distant from the axis of pivot C, is expressed by a first distance L1 and the closest distance from the axis of pivot C to the associated shielding body 40 is expressed by a second distance L2, the first distance L1 is so chosen as to be smaller than the second distance L2. Accordingly, when the door 43 is completely closed, a gap is formed between the shielding body 40 and the associated vent door 43 to allow the shielding body 40 and the vent door 43 to have a large dimensional allowance and, therefore, the yield of the leg shield 37 can be improved.

The shielding body 40 has such a sectional shape as represented by a generally arcuate shape protruding forwardly, and the associated ventilation opening 39 is formed so as to confront the motorcycle body at a location somewhat rearwardly of the foremost portion of the respective shielding body 40 and displaced inwardly towards the motorcycle body. In other words, the shielding body 40 is so formed as to represent a shape, in which an outer surface thereof is bulged outwardly from a front portion towards a laterally outer portion to define a curved surface, and the door body 43f has an outer surface of such a shape that it forms a smooth continuation to the curved surface of the adjacent shielding body 40 when the ventilation opening 39 is closed. More specifically, referring to FIG. 7, assuming an imaginary arc V containing opposite side edges of the door body 43f and depicted about the axis of pivot C, the door body 43f is concaved towards the axis of pivot C at a portion intermediate of the circumference of the door body 43f. In other words, assuming that the distances from the axis of pivot C to left and right side edges of the door body 43f are expressed by D1 and D2, respectively, and the distance from the axis of pivot C to a flat surface of the door body 43f is expressed by D3, the distance D3 is smaller than any of the distances D1 and D2. It is to be noted that although in the illustrated embodiment, the distances D1 and D2 have been shown and described as equal to each other, they may be somewhat different from each other.

As hereinabove described, since the ventilation opening 39 is defined in the associated shielding body 40 at a location inwardly towards the motorcycle body, a stream of air flowing between the motorcycle body and the shielding body 40, when the vent door 43 is fully opened, can be smoothly guided inwardly of the corresponding leg shield 37. Also, since the outer surface of the door body 43f represents such a shape that it forms a smooth continuation to the curved surface of the leg shield 37 when the vent door 43 is set at the completely closed, flow of the incoming wind will not be disturbed.

In addition, the straight line CP connecting between the point M intermediate of the circumference depicted by the imaginary arc V and the axis of pivot C goes through a point of the vent door 43 substantially intermediate of the width thereof. In other words, as hereinbefore described with particular reference to FIG. 5, the door support members 69 and 70 containing (defining) the axis of pivot C are positioned at a location intermediate of the door 43 in the widthwise direction that is perpendicular to the axis of pivot C.

Figure 8A:
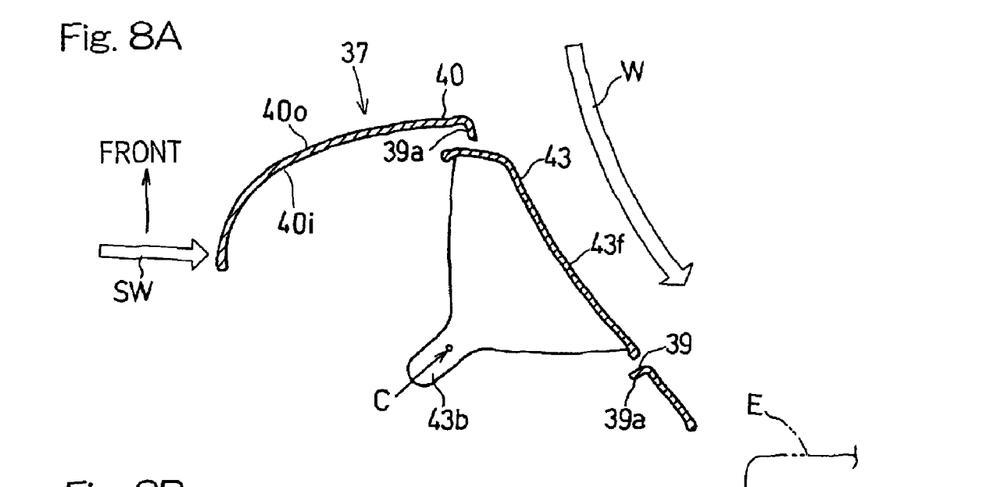
FIG. 8A is a schematic horizontal sectional view showing the leg shield with the door held in the closed position.
Figure 8B:
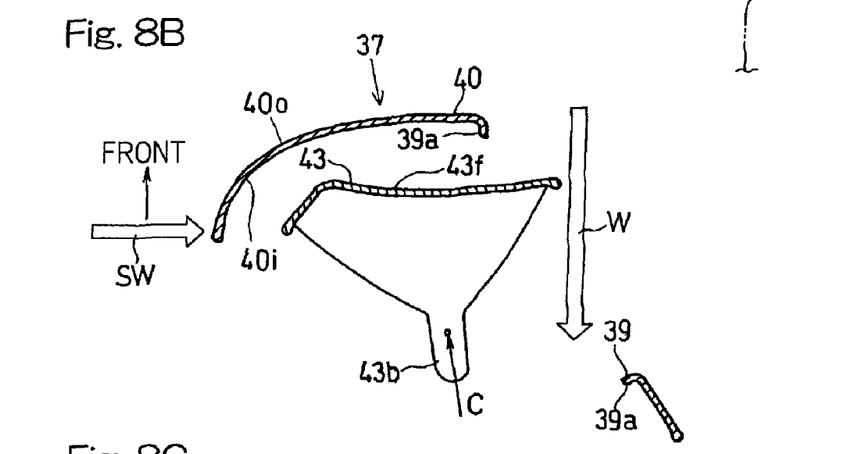
FIG. 8B is a schematic horizontal sectional view showing the leg shield with the door held in one of a plurality of detent positions intermediate between the fully opened and completely closed positions.
Figure 8C:
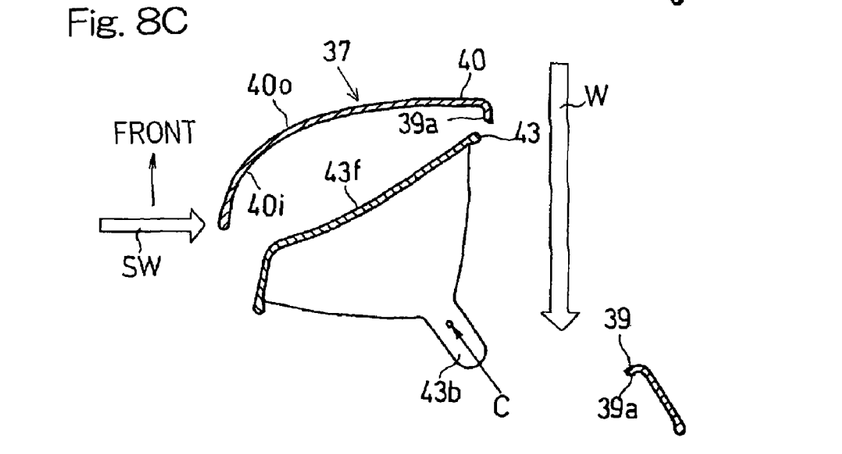
FIG. 8C is a schematic horizontal sectional view showing the leg shield with the door held in the opened position.

FIG. 8A illustrates the leg shield 37 with the vent door 43 held in the closed position to leave the corresponding ventilation opening 39 closed completely; FIG. 8B illustrates the vent door 43 held in an intermediate portion between the opened and closed positions to leave the corresponding ventilation opening 39 open to an intermediate degree; and FIG. 8C illustrates the leg shield 37 with the vent door 43 held in the opened position to leave the corresponding ventilation opening 39 opened fully.

As shown in FIG. 8A, when the ventilation opening 39 is closed completely, the horizontal sectional shape of the door body 43f is inclined. More specifically, it is inclined in a direction away from the motorcycle body as it goes forwards. Accordingly, with the ventilation opening 39 closed completely, the incoming wind W is smoothly guided towards the motorcycle combustion engine E along the door body 43f. Also, since the door body 43f is so inclined as hereinabove described, the pressure of the incoming wind W acting on the vent door 43 when the ventilation opening 39 is completely closed can be reduced as compared with the case, in which the door body 43f is provided perpendicular to the incoming wind W. Yet, the side wind SW flowing from the outside of the motorcycle body in a direction laterally inwardly of the motorcycle body is prevented from directly impinging upon the entire vent door 43 and, accordingly, it is possible to avoid an excessive load on the door support members 69 and 70 shown in FIG. 4.

When the ventilation opening 39 is opened halfway, i.e., opened to an intermediate degree as shown in FIG. 8B, the axis of pivot C, that is, the door support members 69 and 70 are positioned downstream of the incoming wind W with respect to the door body 43f and therefore, the vent door 43 can be firmly supported against the incoming wind W. Also, in this condition, no side wind SW impinges upon the door body 43f and therefore, no excessive load acts on the door support members 69 and 70.

On the other hand, as the ventilation opening 39 transits from the completely closed condition towards the fully opened condition with the respective vent door 43 moving from the completely closed position towards the fully opened position, the vent door 43 pivots about the axis of pivot C within a space inwardly of the associated shielding body 40 and subsequently overlaps the shielding body 40, as viewed from front, when the ventilation opening 39 is fully opened. In other words, as shown in FIG. 8C, the flat surface of the door body 43f is held in position to confront the curved inner surface 40i of the shielding body 40. Accordingly, in the fully opened condition of the ventilation opening 39, the incoming wind W will not collide against the door body 43f and, therefore, the load acting on the door support members 69 and 70 (FIG. 4) can be reduced while the door body 43f is prevented from constituting an obstruction to the incoming wind being entrapped. Also, since in this condition, the side wind SW impinges upon only a portion of the door body 43f and, therefore, the door support members 69 and 70 can be prevented from being excessively loaded.

As hereinabove described, whenever each of the doors 43 is held at any one of the fully opened, completely closed and intermediate positions, the respective vent door 43 can be firmly supported against the incoming wind W and the side wind SW. Also, since the vent door 43 is moved by a pivoting manipulation, as compared with the case in which the door is moved by a sliding manipulation, sliding portions can be minimized and the resistance to the selective opening and closing operation can be reduced to thereby facilitate the selective opening and closing operation.

Figure 9:
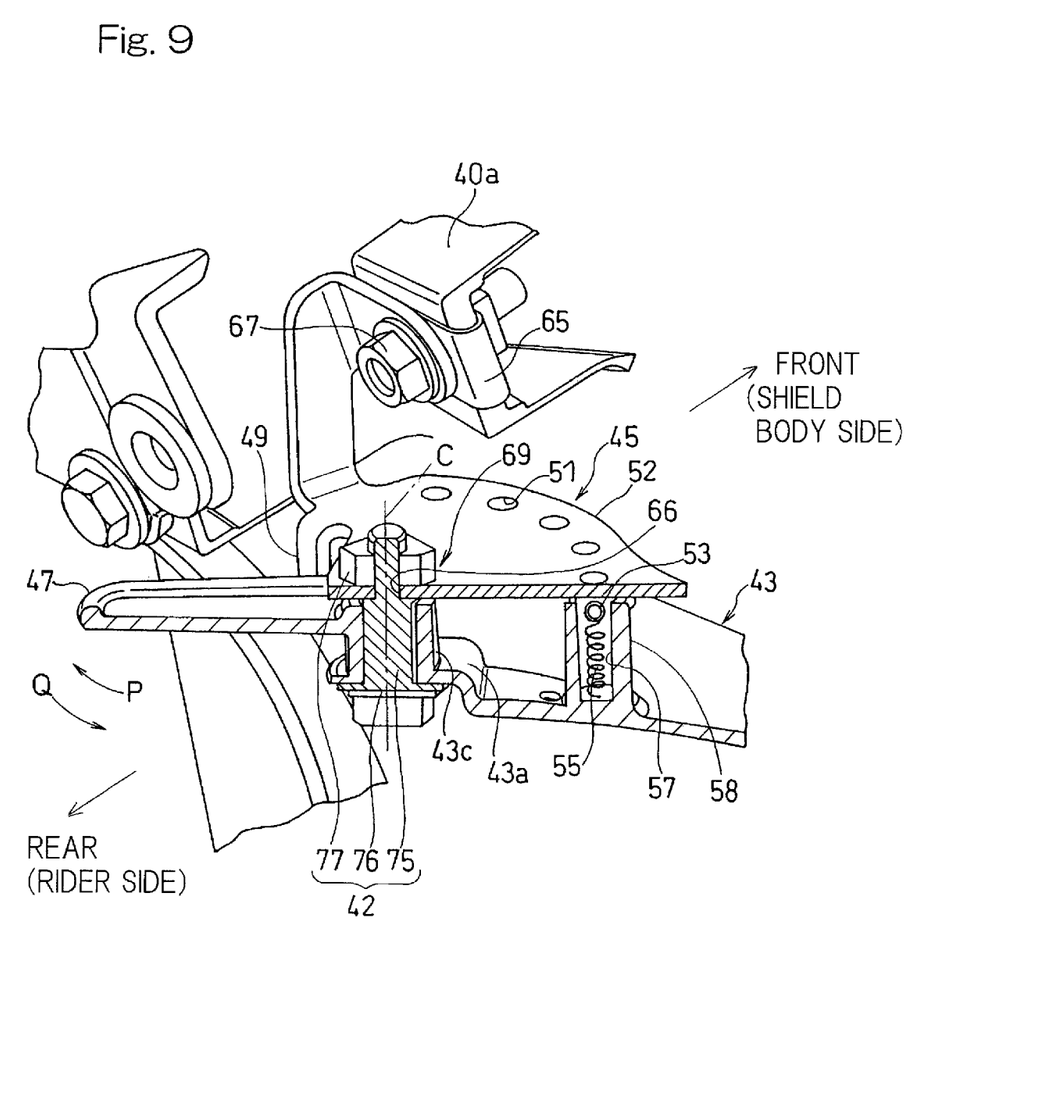
FIG. 9 is a schematic perspective view, with a portion cut away, showing a door adjusting mechanism.

FIG. 9 illustrates a perspective view, with a portion cut away, of the above door adjusting mechanism 45 employed for each of the vent doors 43. As shown in FIG. 9, the door adjusting mechanism 45 for each of the doors 43 includes the bracket 52 having a plurality of engagement holes 51 equal in number to the number of the intermediate opening positions, which can be set by the pivoting of the respective vent door 43 and defining the first door support member 69, an engagement element 53, such as a ball, selectively engageable in any one of the engagement holes 51 when the vent door 43 is pivoted to one of detent positions intermediate between the fully opened position and the completely closed position, and a biasing spring 55 for biasing the engagement element 53 normally towards a projected position so as to engage in one of the engagement holes 51.

The bracket 52 is formed by bending and perforating a metal plate and is provided with a pair of fingers 49, which act as regulating members engageable with the lever 47, one at a time, to define the stroke of pivotal movement of the respective vent door 43. Those fingers 49 are spaced from each other in a circumferential direction about the axis of pivot as best shown in FIG. 3. The lever 47 and the bracket 52 are positioned on respective sides of the axis of pivot C and, more specifically, the lever 47 is positioned rearwardly, that is, on one side close to the motorcycle rider whereas the bracket 52 is positioned forwardly, that is, on the opposite side close to the shielding body 40. The two fingers 49 are provided in an angular row curved about the axis C and spaced away from each other. The engagement holes 51 defined in the bracket 52 as hereinabove described are arranged in an angular row curved about the axis of pivot C and spaced away from each other.

The bracket 52 referred to above is fitted to the shield body 40 through a clamping nut member 65 mounted on the above mounting seat 40a on an upper side of the shielding body 40, by means of a fastening member 67 such as, for example, a bolt. This bracket 52 has a door mounting hole 66 defined in the first door support member 69 in the bracket 52, and a stud shaft 75 such as, for example, a bolt, of the first pivotal support unit 42 is passed through the bearing 43c at the upper end 43a of the vent door 43 and then through the door mounting hole 66, with a free end of the stud shaft 75 protruding upwardly outwardly from the door mounting hole 66. The free end of the stud shaft 75 so protruding upwardly outwardly from the door mounting hole 66 has a nut 77 of the first pivotal support unit 42 fastened thereto to thereby pivotally connect the upper end 43a of the vent door 43 to the shielding body 40. Thus, the use of the bracket 52 in the first door support member 69 makes it possible to increase the strength of the first door support member 69.

The engagement holes 51 are defined in an angular row that is curved about the center of the door mounting hole 66. The engagement element 53 and the biasing spring 55 for biasing such engagement element 53 are accommodated within a tubular chamber 57 which is defined in a tubular protrusion 58 formed in the respective vent door 43, with the biasing spring 55 held in a compressed fashion to allow the engagement element 53 to normally assume the projected position. Hence, the engagement element 53 held in the projected position is urged into one of the engagement holes 51.

Starting from the condition, in which the biasing spring 55 is engaged in one of the engagement holes 51, when the lever 47 is turned in either one of the opposite circumferential directions P and Q about the axis of pivot C, the engagement element 53 is urged into the tubular chamber 57 against the biasing spring 51 with the biasing spring 51 further compressed inwardly. Further turn of the lever 47 until one of the engagement holes 51 is brought into alignment with the tubular chamber 57 so as to occupy a position immediately above the tubular chamber 57, the engagement 53 in the tubular chamber 57 is brought into engagement with such one of the engagement holes 51 by the effect of a restoring force exerted by the inwardly compressed biasing spring 55, resulting in the vent door 43 set to the corresponding one of the detent positions wherefore the corresponding ventilation opening 30 is opened to the opening determined by such one of the detent positions of the vent door 43.

In the illustrated embodiment, five engagement holes 51 are employed and accordingly, vent door 43 can be adjusted to any one of the five detent positions. As hereinbefore described, the stroke of pivotal movement of the respective vent door 43 is regulated by regulating members including the pair of the spaced fingers 49, rigid with or otherwise integral with the bracket 52, in cooperation with the lever 47. Specifically, the spaced fingers 49 are so positioned in the bracket 52 that the lever 47 can be brought into engagement with those fingers 49, one at a time, when the respective ventilation opening 39 is fully opened or completely closed, respectively, and, accordingly, the lever 47 is barred from undergoing an unnecessary movement.

It is, however, to be noted that a single finger 49 may be provided to engage the lever 47, when the ventilation opening 39 is either fully opened or completely closed, to thereby regulate the pivotal movement of the lever 47.

Hereinafter, the manner of how each of the leg shields 37 is fitted to the motorcycle body will be described with particular reference to FIGS. 4 and 10. Referring first to FIG. 4, before each of the engine guards 33 is secured to the associated down tube 18, left and right upper mounts 40c and 40d provided at an upper portion of the respective shielding body 40 are fitted to an upper portion of the engine guard 33 with the use of fastening member or mounting attachments such as, for example, clamps (not shown). On the other hand, a lower mount 40e provided at a lower portion of the shielding body 40 is fitted to a lower portion of the engine guard 33 by threading a fastening member 59 such as, for example, a bolt, which has been passed through a mounting hole 40f defined in the lower mount 40e, into a screw hole 33b provided in a bracket 33a of the engine guard 33. By so doing, the shielding body 40 is fixed to the engine guard 33. Subsequently, the covering 41 referred to previously is fitted to mounts 40g and 40h provided in the shielding body 40, with the use of fastening members (not shown).

Figure 10:
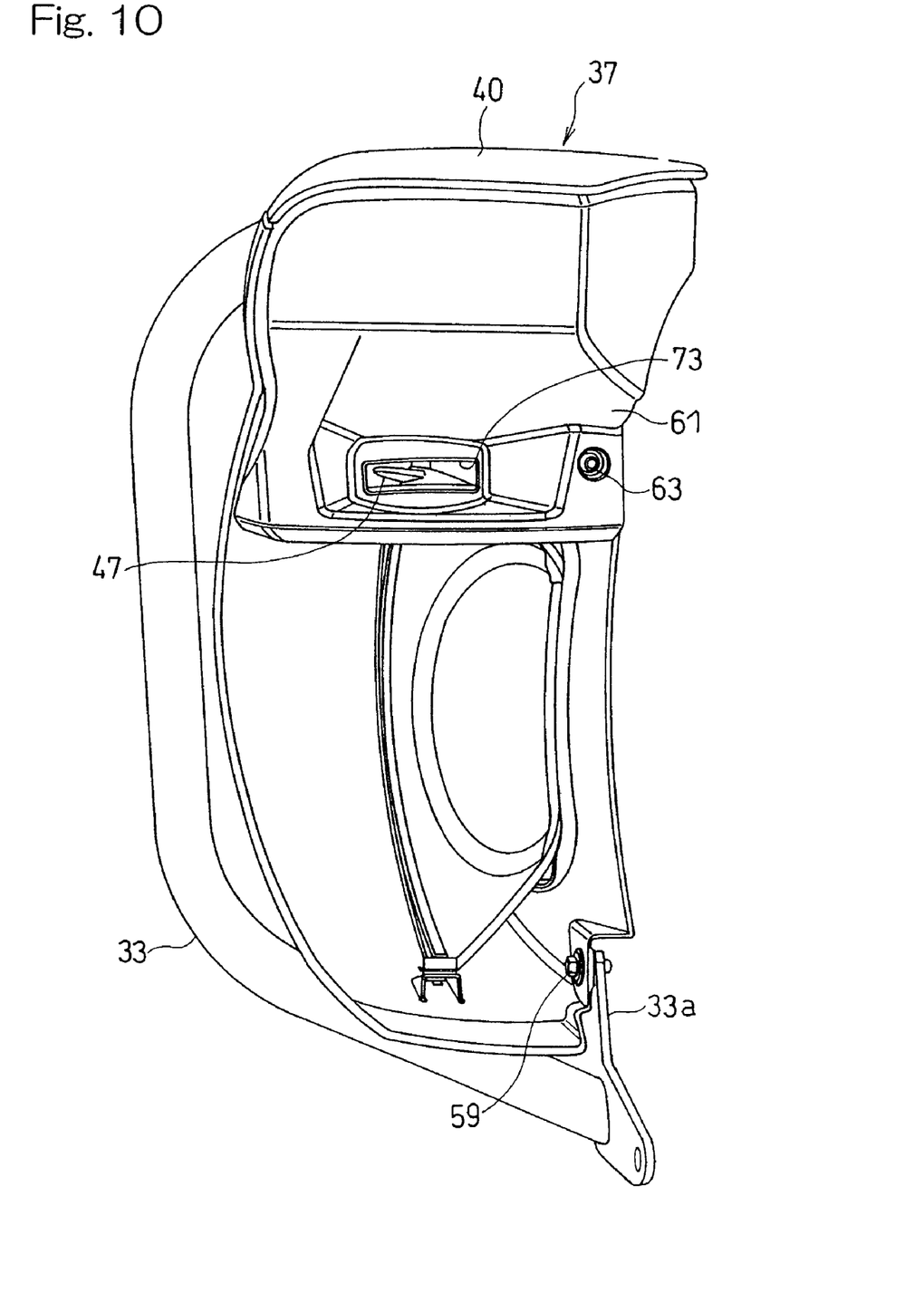
FIG. 10 is a rear view showing the leg shield having an inner cover fitted thereto.

Those mounts 40c, 40d and 40e and the door adjusting mechanism 45, all employed for each of the leg shields 37, are covered by a respective inner cover 61 to thereby provide a pleasant appearance when viewed from rear as shown in FIG. 10. This inner cover 61 is fitted to the bracket 52 of the door adjusting mechanism 45 by means of a mounting member 63 such as, for example, a rivet which is engaged in a mounting hole 52a defined in the bracket 52.

Although not shown, the covering 41 (FIG. 2) is formed with engagement holes (not shown) for the support of the inner cover 61 shown in FIG. 10 and, accordingly, when engagement projections (not shown) formed integrally with the inner cover 61 are engaged in those engagement holes, the inner cover 61 can be stably supported. The lever 47 referred to hereinbefore protrudes partly outwardly through a slot 73 defined in the inner cover 61. The engine guard 33 shown in FIG. 4 is finally fitted to the down tube 18 by means of fastening members (not shown).

As hereinabove described, the leg shield 37 can be fitted to the motorcycle body through the engine guard 33, with the assemblability increased consequently.

With each of the leg shields 37 so constructed as hereinbefore described, each of the vent doors 43 is pivotally supported by the respective shielding body 40 with the upper and lower ends 43a and 43b aligned with the axis of pivot C and coupled with the first and second door support members 69 and 70 at a locations intermediate of the door 43 along the circumference about the axis of pivot C, and accordingly, the respective vent door 43 can be advantageously stably supported even when the wind pressure acts thereon during the complete closure or partial opening of the respective ventilation opening 39. Also, since the axis of pivot C is defined at a position spaced from the ventilation opening 39 and inwardly of the inner surface 40i of the shielding body 40 and the first and second door support members 69 and 70 are positioned spaced away from the associated ventilation opening 39 as viewed from front, it is possible to avoid the possibility that the first and second door support members 69 and 70 may block respective parts of the associated ventilation opening 39 during the full opening of such ventilation opening 39 as shown in FIG. 3. Accordingly, a substantial amount of air can be guided towards the rider's leg.

Also, since as shown in FIGS. 8A to 8C, the vent door 43 has its outer surface moving angularly along the inner surface of the associated shielding body 40 and since during the full opening as shown in FIG. 8C, the vent door 43 overlaps or hides behind the shielding body 40 when viewed from front, an increased amount of the wind can be introduced towards the rider's leg during the full opening of the associated ventilation opening 39 without the latter being blocked by the vent door 43. Further, since no incoming wind impinges directly upon the vent door 43 during the full opening, the great strength of each of the first and second door support members 69 and 70 are not required.

In addition, since the rib 39a protruding inwardly of each of the shielding bodies 40 is formed so as to extend over the entire periphery of the associated ventilation opening 39, the strength of each of the leg shields 37 in the vicinity of the associated ventilation opening 39 can be further increased.

The ventilation opening 39 is defined at a level downwardly of the uppermost portion of the front wheel 4 shown in FIG. 2 and positioned forwardly of the rider's leg and therefore, the incoming wind can be effectively supplied towards the rider's leg. Also, since the lever 47 shown in FIG. 3 is fitted to the upper end 43a of the associated vent door 43, the manipulability when the rider occupying the rider's seat 30 manipulates the associated vent doors 43 to selectively open or close the ventilation opening 39 can be increased even though such ventilation opening 39 is defined at a low position as hereinabove described.

In addition, since the upper end 43a of the vent door 43 is formed with the bearing 43c that is rotatably supported by the first door support member 69 and the lever 47 for moving the vent door 43 between the fully opened and completely closed positions is coupled with such bearing 43c, a torsional force can be added from the lever 47 to the bearing 43c having a high rigidity, during opening or closure of the vent door 43, but does not act directly on the vent door body 43f and, therefore, the vent door body 43f can have a reduced wall thickness.

Yet, the ventilation opening 39 is formed to represent a substantially or generally rectangular shape with the axis of pivot C extending in a direction lengthwise of such ventilation opening 39 and since the sectional shape of the vent door 43 along the axis of pivot C, as shown in FIG. 6, is a curved shape bulging outwardly from the upper end 43a and the lower end 43b, such vent door 43 can represent a smoothly curved shape. Hence, even though the vent door 43 is formed to represent the substantially or generally rectangular shape complemental to the shape of the associated ventilation opening 39, it is possible to prevent an intensive load from acting on the upper end 43a or the lower end 43b of the vent door 43 under the influence of the wind pressure or a driving force during the turn of the lever 47, resulting in increase of the strength of the vent door 43. Also, since the fingers 49 engageable with the lever 47 shown in FIG. 3 regulate the stroke of pivotal movement of each of the vent doors 43, it is possible to avoid a contact of the door body 43f with any one of the fingers 49.

Moreover, since the axis of pivot C best shown in FIG. 8A is spaced from the associated vent door 43, it is possible to smoothly move the curved vent door 43 along the inner surface 40i of the curved shielding body 40 during the opening even though the axis of pivot C is held at a position displaced laterally outwardly from the associated ventilation opening 39.

As shown in FIG. 9, the door adjusting mechanism 45 includes the engagement holes 51 corresponding in number to the number of the detent positions and the engagement element 53 selectively engageable in any one of the engagement holes 51 and normally biased by a spring force to engage in one of the engagement holes 51. Accordingly, when the vent door 43 is displaced against the spring force in a direction required to open or close the associated ventilation opening 39, the engagement element 53 then engaged in one of the engagement holes 51 can be brought into engagement with a different one of the engagement holes 51 and, therefore, the opening of the vent door 43 can be adjusted stepwise without requiring any special manipulation for adjusting the opening, allowing the once selected opening to be stably retained.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, the axis of pivot C may not extend vertically and, also, each of the ventilation openings 39 may not necessarily be limited to the substantially or generally rectangular shape, but may have any other shape such as, for example, a round shape, an elliptical shape or an oval shape.

Also, in the embodiment hereinbefore fully described, the bearing 43c and the through hole 43d are provided in the upper and lower ends 43a and 43b of each of the vent doors 43 and the upper and lower ends 43a and 43b are rotatably supported by the first and second door support members 69 and 70 through the stud shaft 75 and the pin 71, respectively. However, bearings may be formed integrally with the opposite ends of the vent door so that the latter can be supported by door support members provided in the associated shielding body 40.

Also, the stud shaft may be formed in one end and the bearing may be formed in the other end. In addition, even in the door adjusting mechanism 45, design may be made that the tubular chamber 57 for accommodating therein both of the biasing spring 55 and the engagement element 53 may be defined in the bracket 52 of the respective shielding body 40 and, in such case, the engagement holes 51 may be formed in the respective vent door 43. Each of the vent doors 43 is satisfactory provided that the longitudinal sectional shape thereof represents a curved shape including, for example, an arcuate shape or a channel-sectioned shape.

The present invention, although having been shown and described as applied to the automotive vehicle such as the motorcycle, can be equally applied to a motor scooter type vehicle.

Accordingly, such changes and modifications are, unless they depart from the scope of the present invention as delivered from the claims annexed hereto, to be construed as included therein.

What is claimed is:

1. A leg shield for use in an automotive vehicle for covering a leg of a rider from front, which comprises:
   a shielding body positioned forwardly of a foot rest and having a ventilation opening defined therein; and
   a vent door pivotable about an axis of pivot for selectively opening and closing the ventilation opening;
   wherein the vent door has first and second ends being spaced from each other in a direction conforming to the axis of pivot and being pivotably supported at the first and second ends by first and second door support members in the shielding body;
   wherein the axis of pivot is positioned spaced from the ventilation opening inwardly of an inner surface of the shielding body; and
   wherein the first and second door support members in the shielding body and the axis of pivot are positioned spaced away from the ventilation opening when viewed from front,
   wherein the vent door has an outer surface capable of angularly moving along an inner surface of the leg shield during pivotal movement of the vent door and the entirety of the vent door, during the full opening thereof, overlap the shielding body when viewed from the front.

2. The leg shield for use in the automotive vehicle as claimed in claim 1, further comprising a reinforcement rib formed in the inner surface of the shielding body so as to protrude inwardly of the shielding body over an entire circumference of the ventilation opening.

3. The leg shield for use in the automotive vehicle as claimed in claim 1, wherein at least one of the first and second ends of the vent door is formed with a to-be-supported member supported pivotably by the corresponding door support member of the shielding body and further comprising a lever connected to the to-be-supported member for selectively opening and closing the vent door,
   wherein the lever is positioned spaced away from the axis of pivot to protrude inwardly of the vent door.

4. The leg shield for use in the automotive vehicle as claimed in claim 1, further comprising a lever for selectively opening and closing the vent door, the lever being fitted to one of the first and second ends of the vent door, which is positioned on an upper portion of the vent door,
   wherein the lever is positioned spaced away from the axis of pivot to protrude inwardly of the vent door.

5. The leg shield for use in the automotive vehicle as claimed in claim 3, wherein the ventilation opening is formed in a rectangular shape and the axis of pivot extends in a direction lengthwise of the ventilation opening and wherein a sectional shape of the vent door along the axis of pivot represents a curved shape bulged outwardly from the first and second ends.

6. The leg shield for use in the automotive vehicle as claimed in claim 4, wherein the ventilation opening is formed in a rectangular shape and the axis of pivot extends in a direction lengthwise of the ventilation opening and wherein a sectional shape of the vent door along the axis of pivot represents a curved shape bulged outwardly from the first and second ends.

7. The leg shield for use in the automotive vehicle as claimed in claim 3, further comprising a regulating member provided in the shielding body and engageable with the lever for regulating a stroke of pivotal movement of the vent door during at least one of full opening and completely closing.

8. The leg shield for use in the automotive vehicle as claimed in claim 4, further comprising a regulating member provided in the shielding body and engageable with the lever for regulating a stroke of pivotal movement of the vent door during at least one of full opening and completely closing.

9. The leg shield for use in the automotive vehicle as claimed in claim 1, further comprising a door adjusting mechanism for adjusting the opening of the vent door in stepwise fashion, the door adjusting mechanism having a plurality of engagement holes formed in one of the shielding body and the vent door and corresponding respectively to the stepwise opening of the ventilation opening, and an engagement element formed in the other of the shielding body and the vent door for selectively engaging in any one of the engagement holes when the door is pivoted, the engagement element being normally urged into one of the engagement holes by a spring force.

10. The leg shield for use in the automotive vehicle as claimed in claim 1, wherein the automotive vehicle is a motorcycle.

11. A leg shield for use in an automotive vehicle for covering front portion of a leg of a rider, which comprises:
    a shielding body positioned forwardly of a foot rest and having a ventilation opening defined therein; and
    a vent door pivotable about an axis of pivot for selectively opening and closing the ventilation opening;
    wherein the vent door has first and second ends being spaced from each other in a direction conforming to the axis of pivot and being pivotably supported at the first and second ends by first and second door support members in the shielding body;
    wherein the axis of pivot is positioned spaced from the ventilation opening inwardly of an inner surface of the shielding body;
    wherein the first and second door support members in the shielding body are positioned spaced away from the ventilation opening when viewed from front; and
    wherein the vent door has an outer surface capable of angularly moving along an inner surface of the leg shield during pivotal movement of the vent door and a portion of the vent door, during a partial opening of the vent door, overlaps the shielding body in a longitudinal direction when viewed from the front of the shielding body.

12. The leg shield for use in the automotive vehicle as claimed in claim 11, wherein the entirety of the vent door, during a full opening of the vent door, overlaps the shielding body when viewed from the front of the shielding body.

13. The leg shield for use in the automotive vehicle as claimed in claim 11, wherein the first and second ends of the vent door are formed with a to be supported member supported pivotably through a first pivotal support unit and a second pivotal support unit by the corresponding door support member of the shielding body, respectively; and wherein the first pivotal support unit and the second pivotal support unit are positioned to be spaced a distance from each other in the pivotal axial direction with their respective axes aligned with each other on the same line to thereby define the axis of pivot.

14. The leg shield for use in the automotive vehicle as claimed in claim 13, wherein the ventilation opening is formed in a rectangular shape and the axis of pivot extends in a direction lengthwise of the ventilation opening and wherein a sectional shape of the vent door along the axis of pivot represents a curved shape bulged outwardly from the first and second ends.

* * * * *